July 17, 1962 H. S. ALSPACH ET AL 3,044,117
APPARATUS FOR MAKING FIBER-RESIN PARTS
Filed Sept. 21, 1959 6 Sheets-Sheet 1

INVENTORS.
HARDIN S. ALSPACH
NORMAN L. GAMBLE
WILLIAM J. HAMPSHIRE
JERRY E. MELLINGER
HENRY MUSCH
BY
ATTORNEY

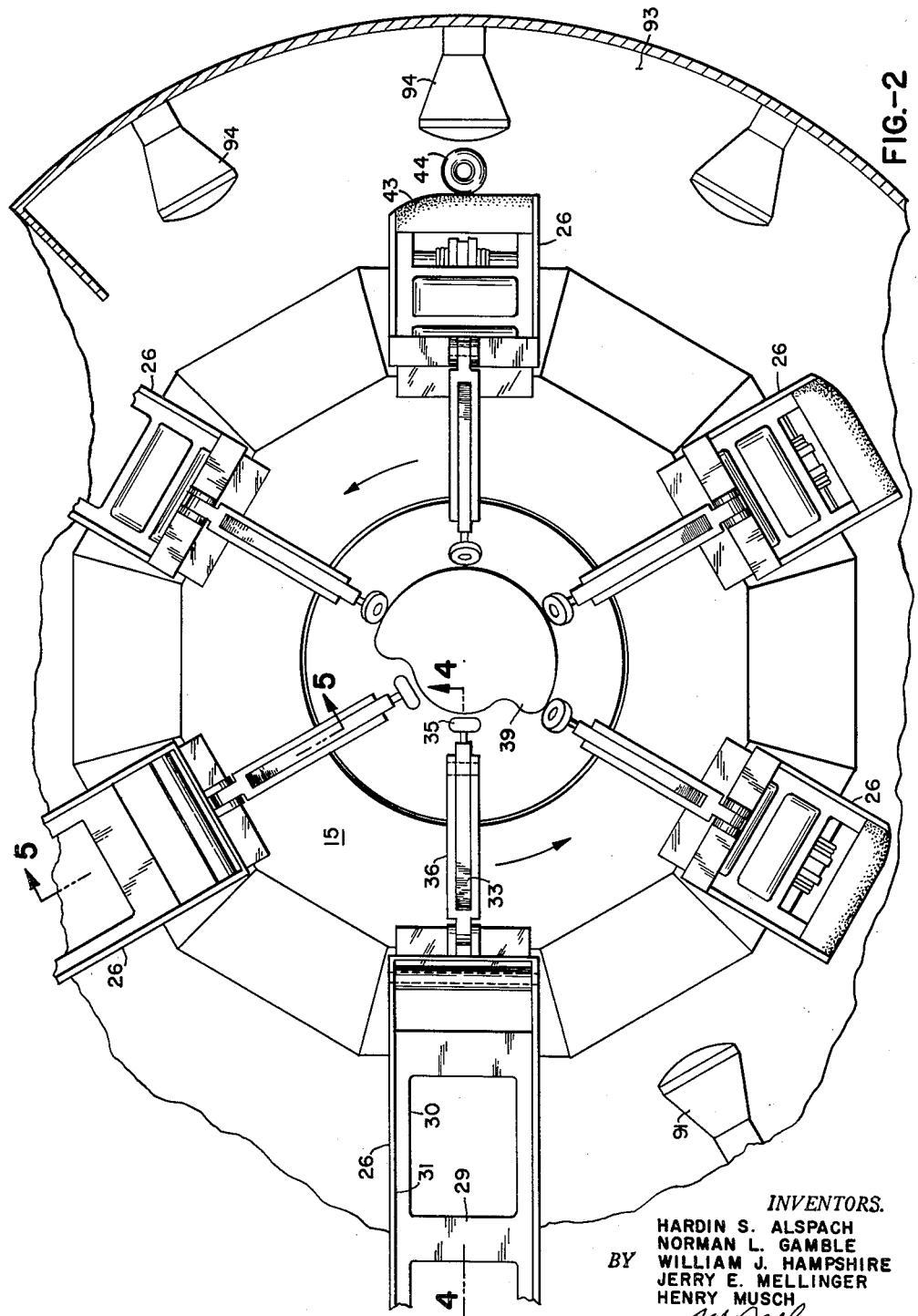

July 17, 1962 H. S. ALSPACH ET AL 3,044,117
APPARATUS FOR MAKING FIBER-RESIN PARTS
Filed Sept. 21, 1959 6 Sheets-Sheet 3

INVENTORS.
HARDIN S. ALSPACH
NORMAN L. GAMBLE
BY WILLIAM J. HAMPSHIRE
JERRY E. MELLINGER
HENRY MUSCH
ATTORNEY

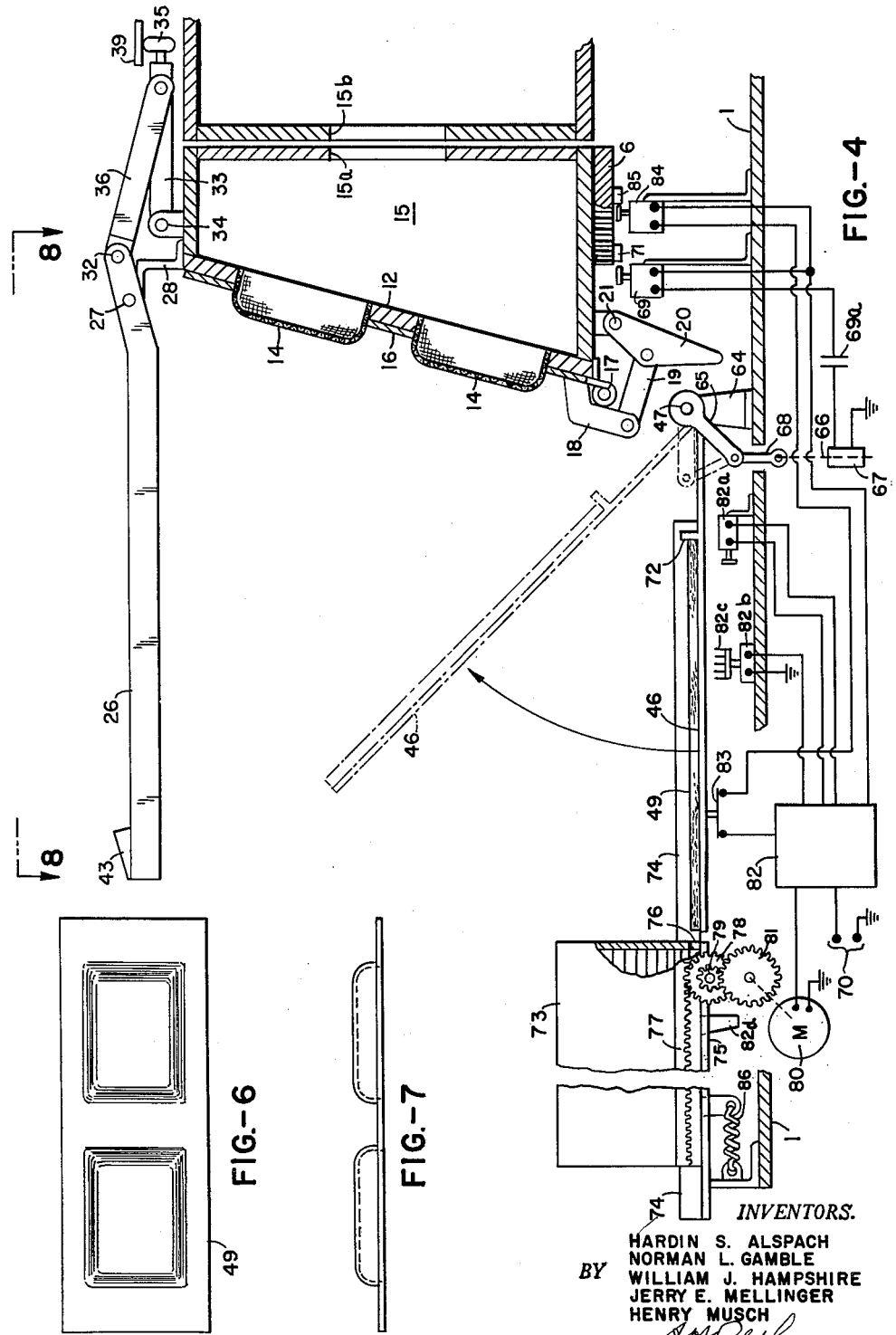

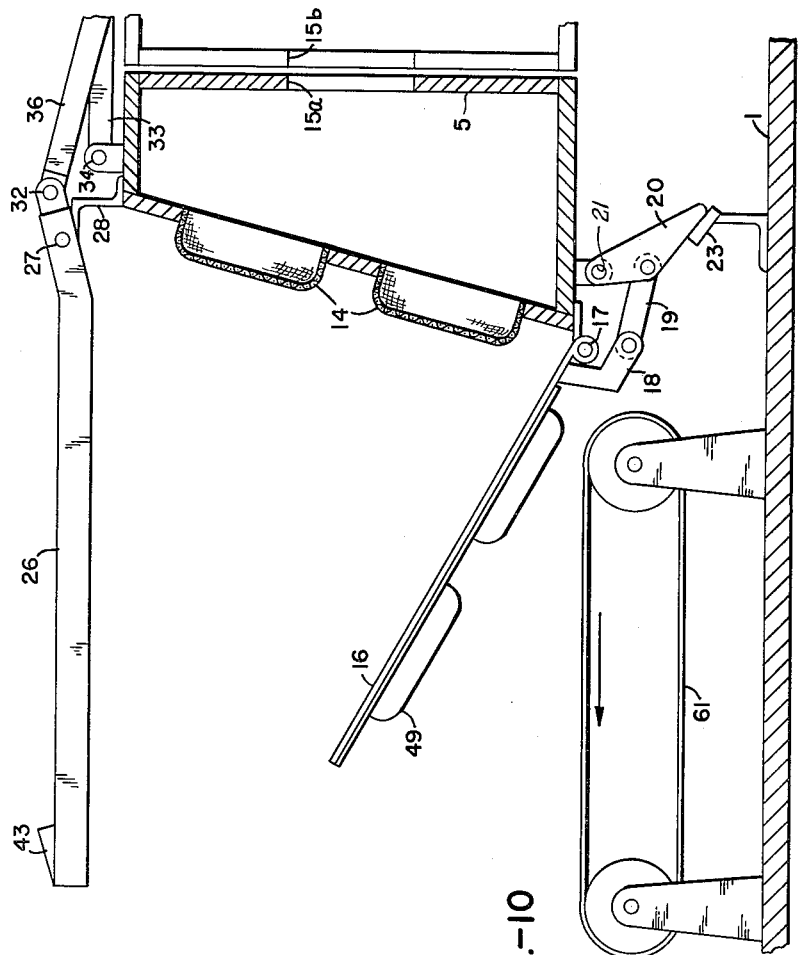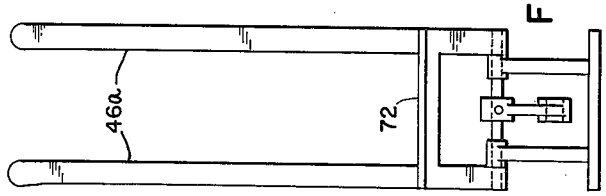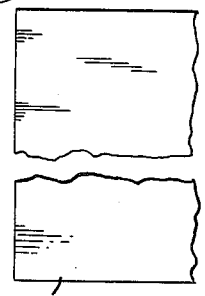

July 17, 1962   H. S. ALSPACH ET AL   3,044,117
APPARATUS FOR MAKING FIBER-RESIN PARTS
Filed Sept. 21, 1959   6 Sheets-Sheet 6
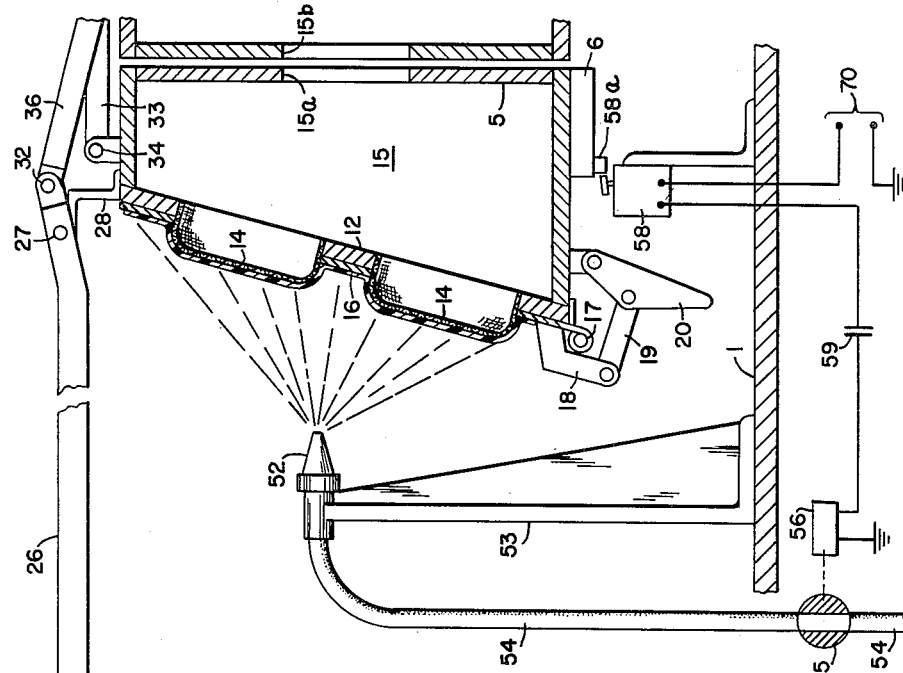
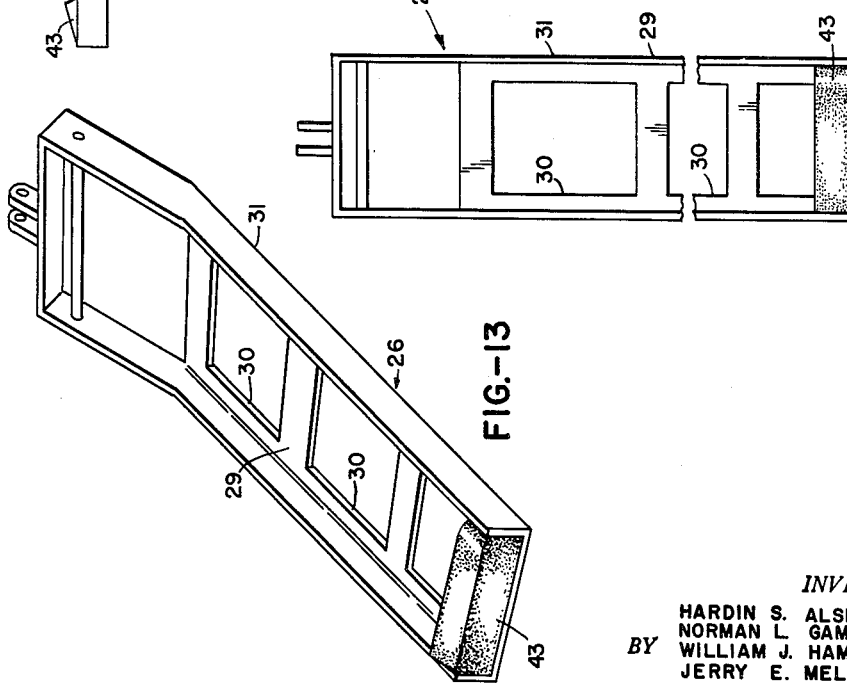
INVENTORS.
HARDIN S. ALSPACH
NORMAN L. GAMBLE
BY WILLIAM J. HAMPSHIRE
JERRY E. MELLINGER
HENRY MUSCH
ATTORNEY United States Patent Office 3,044,117
Patented July 17, 1962

3,044,117
APPARATUS FOR MAKING FIBER-RESIN PARTS
Hardin S. Alspach, Akron, Norman L. Gamble, Tallmadge, William J. Hampshire, Cuyahoga Falls, Jerry E. Mellinger, Kent, and Henry Musch, Akron, Ohio, assignors to Goodyear Aircraft Corporation, Akron, Ohio, a corporation of Delaware
Filed Sept. 21, 1959, Ser. No. 841,091
6 Claims. (Cl. 18—20)

This invention relates to apparatus for the manufacture of articles composed of fibers and plastic material and is especially useful in the manufacture of mat parts of such materials, and, more particularly, may be employed wherever a concavo-convex article of plastic resin and fiberglass is to be manufactured.

In the manufacture of articles of concavo-convex cross section in any plane normal to the surface of the article from glass fibers and resin it is usually important that the glass fibers be distributed in a maner to provide uniform strength in the article. Heretofore such articles have been constructed by depositing short fibers of the glass upon a perforate form so as to lay the fibers in all directions. This was accomplished for example by blowing the fibers with an air stream directed toward the perforate form while withdrawing air through the form. The deposited fibers were then sprayed with a resin or other binder to hold them in place.

Difficulty has been experienced in the practice of prior apparatus in that careful manipulation of the fiber-depositing means was required to produce a successful article and it was extremely difficult to produce a uniform product. Moreover, known apparatus was not automatic and required much hand operation and attention.

The present invention has for an object to provide substantially fully automatic apparatus of relatively low initial and maintenance cost which operates rapidly and efficiently to produce a uniform high grade product.

Other objects are to provide improved apparatus for producing articles having uniform and high quality, strength and fiber distribution, and to provide for rapid, inexpensive and automatic construction of the articles in succession in a uniform manner.

These and other objects will appear from the following description and the accompanying drawings forming a part thereof.

In the drawings,

FIG. 2 is a plan view of an apparatus constructed in accordance with and embodying the invention, parts of the apparatus being broken away.

FIG. 4 is a vertical cross section thereof along line 4—4 of FIG. 2, showing the loading station.

FIG. 5 is a vertical cross section thereof, taken on line 5—5 of FIG. 2, showing the unloading station.

FIG. 6 is a plan view of a typical article produced in accord with the invention.

FIG. 7 is a side view thereof.

FIG. 8 is a plan view of one of the female or complementary mold members as seen on line 8—8 of FIG. 4.

FIG. 9 is a plan view of one of the stripper plates.

FIG. 10 is a plan view of the swinging carrier and its pivotal support.

FIG. 12 is a vertical cross sectional view similar to FIG. 4 and showing another embodiment of the invention.

FIG. 13 is a perspective view of a female mold member.

General Assembly of Apparatus

Figure 3:
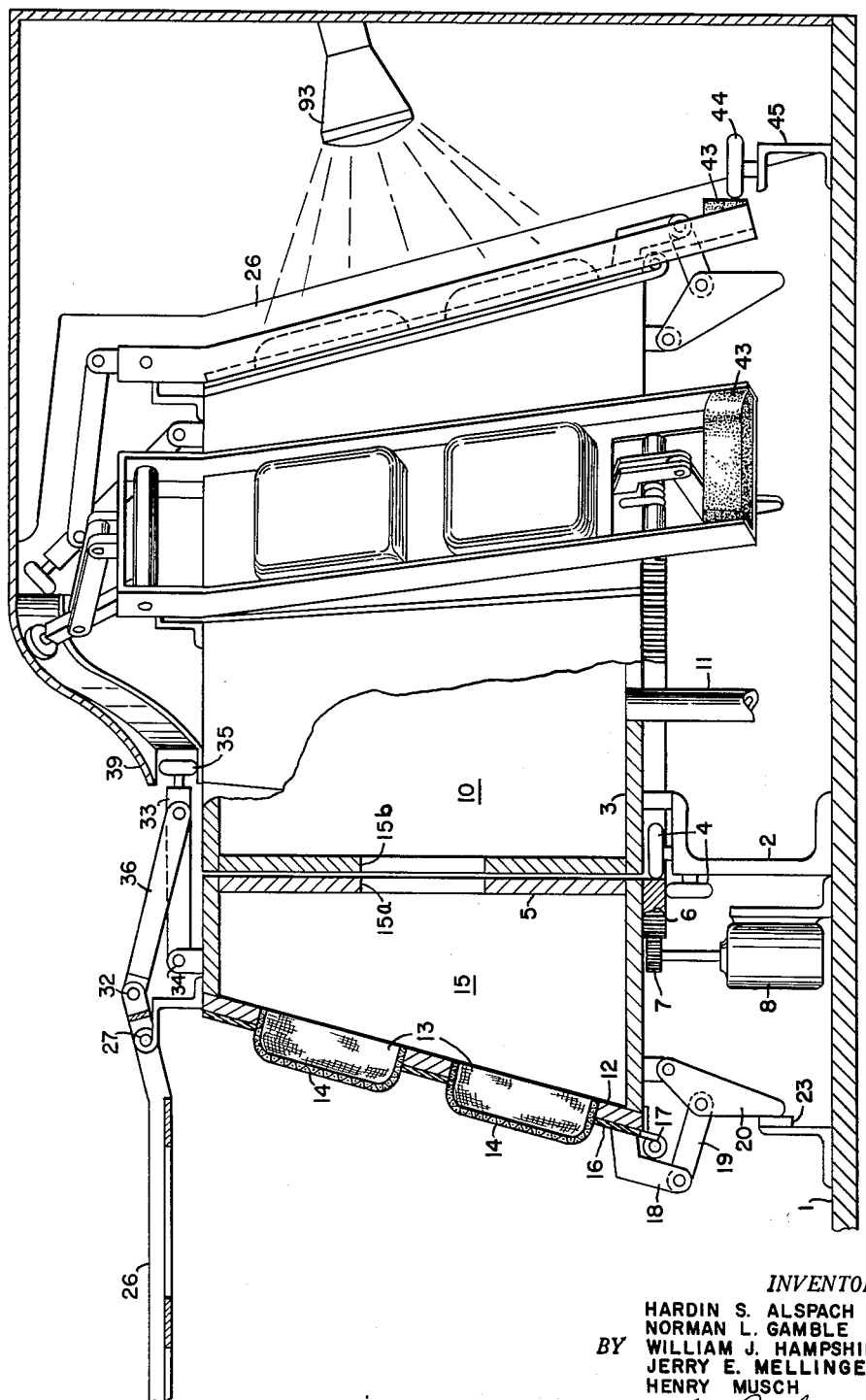
FIG. 3 is a side elevation thereof partly broken away and partly in section.

Referring to the drawings, and first to FIGS. 2 and 3 thereof, the numeral 1 designates a fixed platform carrying a circular support channel 2 on which is mounted a fixed drum 3. Rollers 4 provided around the periphery of the support channels 2 rotatably support an endless chamber 5 which has a ring gear 6 secured to its bottom with which engages a spur gear 7 driven by a motor 8 to effect rotation of the chamber 5 around the drum 3. The motor drive is such that the motor 8 operates intermittently to rotate the chamber 5 through 30°, for example, followed by a selected dwell time, for example, one minute. Controls of this type are known to the man skilled in the art and will not be described in detail except to note that the dwell time is usually adjustable.

Figure 11:
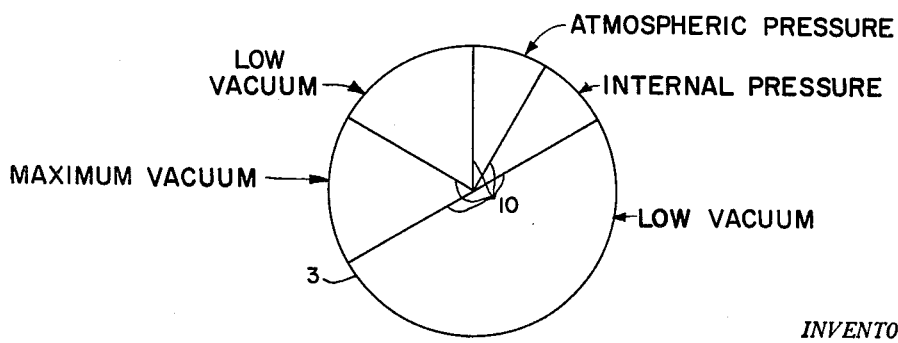
FIG. 11 is a diagrammatic plan view of the vacuum and pressure chambers which may be associated with one form of the apparatus.

The drum 3 has partitions 10 extending radially therein as best seen in FIG. 11, and each of the areas marked low vacuum, maximum vacuum, low vacuum, internal pressure and atmospheric has an appropriate conduit, such as conduit 11, connected thereto to establish the proper pressure therein. The outer periphery of the drum 3 is cylindrical, as is the inner periphery of the hollow chamber 5 with a close sliding fit therebetween. The outer periphery of the chamber 5 is slanted inwardly and is made polygonal, for example, of twelve sides and each flat side or plate 12 has openings 13 therethrough of a size and shape corresponding to the formed area of the desired articles. These openings are covered by convexly formed members 14 of wire netting comprising the mold forming members, usually male as shown. Each flat plate or side 12 is separated from the adjacent flat sides by partitions 15 extending vertically and radially of the chamber 5 to thereby make a separate chamber behind each flat side 12, each chamber having a round opening 15a therethrough adapted to align with openings 15b through the drum 3 to thereby connect the sides 12 in turn to the proper pressure condition or chamber of FIGS. 1 and 11 as hereinafter more fully described.

Each side or plate 12 forms a mold plate and normally overlying each male mold plate 12 but displaceable therefrom is a stripper plate 16 having clearance openings therethrough for clearing the members 14. These stripper plates are hingedly mounted on the bottom of chamber 5, as at 17, and may be swung outwardly to strip the molded parts as illustrated in FIG. 5. For operating them in their stripping action, each is formed with a dependent ear 18, and a link 19 pivotally connects the ear to a lever 20 pivotally mounted on the chamber 5, as at 21. A spring hinge at 17 may be used for this purpose of holding stripper 16 against plate 12. A depending end of lever 20 engages a cam surface 23 (see FIG. 5) during rotation of gear 6 and forces the stripper plate outwardly as shown in FIG. 5.

At each mold plate 12, a female mold member 26 is provided and is hinged as at 27 to a bracket 28 mounted on chamber 5. Each female mold member is adapted to be swung from an operative position shown at the right side of FIG. 3 where it overlies the male mold member and stripper plate, to an inoperative generally horizontal position shown at the left of FIG. 3. Each female mold member (FIG. 13) has a flat lower surface 29 having openings 30 therethrough for receiving the male members 14. The margins of the female members are reinforced by side walls 31.

For controlling the female mold members, each has a pivotal connection 32 with a link 36 which is pivotally secured to a lever 33 in turn pivotally secured, as at 34, to chamber 5. The lever 33 has a cam roller 35 at its free end. Mounted on the drum 3 is an arcuate cam member 39 having a horizontal cam surface extending concentric of the drum 3. The position of the cam 39 is such as to hold the female mold member 26 in open position for a selected portion of the movement of chamber 5 around the drum 3 and in closed position during another portion of the travel, as hereinafter described.

For holding the female mold members 26 in clamped and closed position, each female mold member has a cam block 43 secured to its free end. Roller guide members 44 (see FIG. 3) are mounted on supports 45 secured to platform 1 at positions where the mold is to be held closed and engage the cam blocks 43.

In the operation of the apparatus, the chamber 5 and gear 6 and the mold members which it supports are rotated intermittently in a counter-clockwise direction as seen in FIG. 2 through an arc of 30° with a one-minute dwell at each station.

Loading Station

Each set of molds is thus presented to a plurality of stations the first of which is the loading station. At this station, as seen in FIG. 4, the female mold member 26 is in inoperative horizontal position and the stripper plate 16 overlies the plate 12. In one typical loading operation a mat or blank 49 of resin-impregnated glass fibers is employed. To handle the mat or blank a swinging carrier 46 is pivotally mounted on platform 1, as at 47, and is swung from the horizontal position shown to a position overlying the stripper plate 16. The mat or blank 49 which has been deposited upon the carrier 46 is thus laid by the carrier into molding position.

The carrier 46 is pivoted on a bracket 64 mounted on platform 1. Carrier 46 has an integral arm 65 which is connected to the armature 66 of a solenoid 67 by a connecting rod 68. The solenoid is operated from a power source 70 by a microswitch 69 operating through a controlled-opening, time-delay relay 69a. Switch 69 is fixed to platform 1 and is adapted to be closed by a cam 71 carried by gear 6. The switch 69 is so located that as an open mold enters the loading station the switch is open and the carrier 46 rests in a horizontal position. At the center of the loading station, the switch is contacted by cam 71 and closes operating through relay 69a to fire solenoid 67 thereby lifting the carrier to deposit a blank on the male mold member. Relay 69a closes for the several seconds time required to move the blank against the mold where it is held by vacuum. Relay 69a then opens allowing carrier 46 to be pulled back to horizontal position by the spring of solenoid 67. The carrier has two spaced apart radial fingers 46a (FIG. 10) which support the side margins of the blank and these have stop means 72 for locating the blank.

The blanks may be deposited successively on carrier 46 as by a feed box 73 mounted to slide along rails 74 from a position to the left of FIG. 4 over a plate 75 to a position over the carrier 46. The bottom of the feed box is open and a notch 76 in its right end permits exit of one blank 49 at a time.

For moving the feed box a rack 77 is mounted therealong in position to be engaged by a pinion 78 on a shaft 79. Pinion 78 may be driven by a motor 80 having a pinion 81 for meshing with the pinion 78. The motor is in series with the power source 70, a switch 83 closed when the carrier 46 is in a lowered position, and a microswitch 84 normally open mounted on platform 1 in a position to be engaged and closed by a cam 85 on gear 6.

The arrangement is such that as the mold centers at the loading station cam 85 closes switch 84 priming delayed-closing, time-control relay 82 for operation as soon as carrier 46 returns to horizontal position to close switch 83. Thus, motor 80 is energized after the several seconds delay to advance feed box 73 to the right in FIG. 4. A microswitch 82a struck by lug 82d on the box 73 shuts off motor 80 and operates solenoid 82b to move fingers 82c into engagement with the bottom blank 49 so that upon return movement of the box 73 the bottom blank 49 is retained on the carrier 46. Solenoid 82b releases when box 73 returns to its initial position.

In order to return the feed box to initial position, various expedients may be used but in the embodiment of the invention shown a coil return spring 86 is secured between rails 74 and feed box 73 so as to be tensioned by advance of the box and to return it when the motor 80 shuts off. If carrier 46 is not in its lowered position, the feed box cannot be advanced as switch 83 is open. Thus, with a blank 49 fed to the carrier 46 by the mechanism described the carrier is ready to feed the blank to the next mold advanced to the loading station.

Low vacuum is applied at the loading station for holding the blank 49 in place on the male mold as well as to exhaust solvents from the blank by means heretofore described. As the chamber 5 indexes 30° to move each mold away from the loading station cam track 39 curves away from the top of drum 3 allowing female mold 26 to move down against the blank 49 to rest thereagainst without any real pressure which is not applied until the mold closing station is reached as hereinafter described.

Preheat Station

Figure 1:
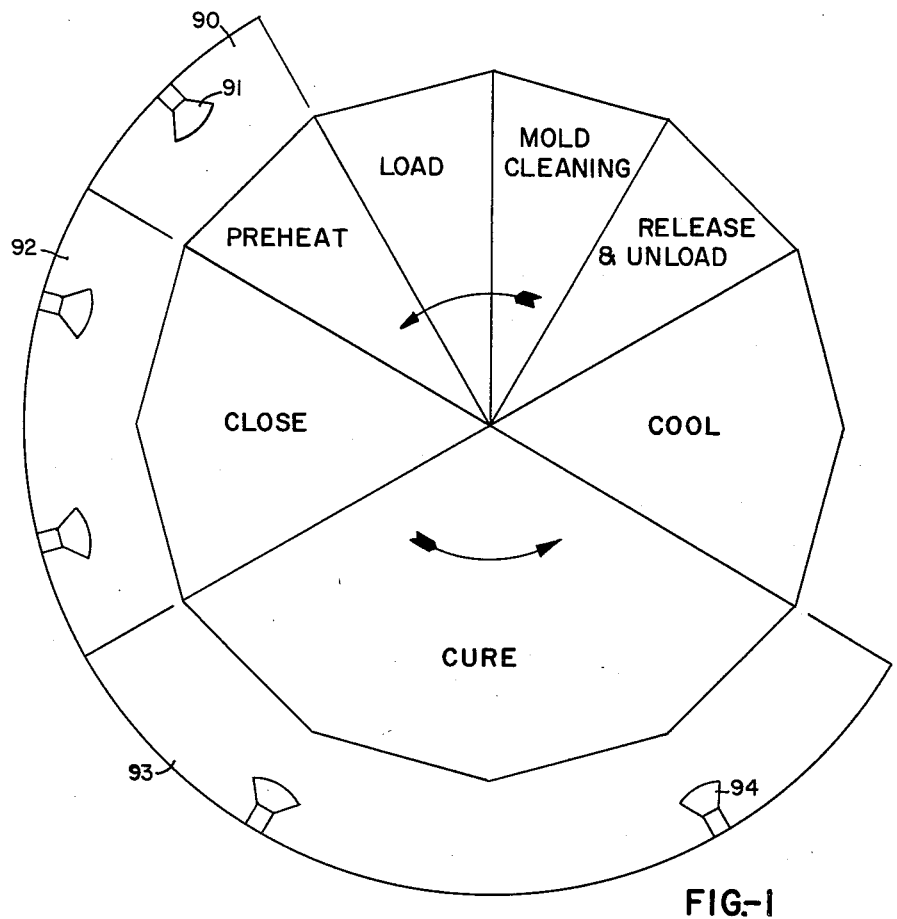
FIG. 1 is a diagrammatic plan view of a cycle of operations of an apparatus incorporating the principles of the invention.

From the loading station shown in FIG. 4, each mold is advanced in turn to a preheat station by the 30° indexing of the chamber 5. As shown in FIG. 1, an oven 90 surrounds the preheat station for preheating and softening the blank 49. The oven 90 may be heating in any desired way, for example, by infra-red lamps 91. Low vacuum is still applied to the blank 49 at the preheat station.

Mold Closing Station

From the preheat station each mold is indexed 30° to a mold closing station extending over an arc of 60° so that each mold remains for a period of two minutes in a low temperature oven 92, for example, having a temperature of 180°. Thus, the blank 49 which has been softened for one minute in the preheat oven 90, in effect, soaks for another minute in the oven 92 at the mold closing station before the next indexing movement carries the molds and blank into the second half of the oven 92 at the mold closing station. Movement of the mold into the second half of the oven 92 causes the rollers 44 (see FIG. 3) to engage with the cam 43 on each female mold 26 to press it down tightly against the heat softened blank 49 and to press the blank between the female mold 26 and the male mold 14. During the entire time at the mold closing station the molds are subjected to maximum or high vacuum as seen from FIG. 11.

Curing Station

Leaving the mold closing station as just described, each mold assembly passes for four indexing movements, or four minutes, in the curing station including high temperature oven 93, for example, at a curing temperature, usually between 225° and 300°, and having a suitable source of heat, such as infra-red lamps 94. During this entire time rollers 44 continue to engage with cam 44 to keep the mold parts 26 and 14 tightly closed against the blank 49, and with each blank being properly cured during its passage through the oven. At the curing station low vacuum is applied to the blank as evident from FIG. 11.

Cooling Station

From the curing station the chamber 5 and each mold assembly is indexed 30° to a cooling station where the oven 94 no longer surrounds the mold assembly, and rollers 44 no longer engage with cam 43. However, low vacuum is still applied and if the blank is semi-perforate after curing cool atmosphere air is sucked through the blank. Usually in the movement of each mold to the cooling station cam track 39 reengages with roller 35 to raise the female mold 26 away from the cured blank to leave it exposed for cooling even though it is not semi-perforate. Each blank remains in the cooling station for two indexing movements or a total of 60° and two minutes.

Release Station

The cured and partially cooled blank is next indexed 30° to a release station where the low vacuum in chamber 5 is changed to internal pressure (see FIG. 11) and where stripper plate 16 is moved away from plate 12 by cam 23 operating through linkage 18, 19 and 20 to strip the cured blank from the male mold 14 as best seen in FIG. 5. The stripper plate 16 deposits the cured blank on a suitably driven conveyor 61 mounted on platform 1 and the blanks are conveyed to a bin 62.

Mold Cleaning Station

Each mold is next indexed 30° to a mold cleaning station connected to atmospheric pressure (see FIG. 11) and the operator of the apparatus cleans the molds with suitable means if cleaning is needed so that the cleaned molds are ready to index to the loading station with the operation then being repeated. As the molds index from the mold cleaning station to the loading station cam track 23 changes contour to swing stripper plate 16 back against mold plate 12.

Operation

In the operation of the apparatus as just described, it will be understood that plastic or resin impregnated blanks or mats of glass fibers, hair, hemp, cotton or other reinforcing means are utilized with the blanks or mats being cured into finished articles. It will be recognized that instead of utilizing partially open female molds as shown in FIG. 13 that the female molds may fully enclose and engage the blanks. Also, it is evident that the male mold members 14 may be solid, rather than perforated if not fully equivalent results are desired.

The apparatus of the invention can be used to make so-called "preforms" that is parts which are subsequently given a final curing operation in other molds, and in this case the cure is not carried to completion in the apparatus of the invention but only a partial cure is performed. In this event instead of a typical dwell of one minute at each station the dwell could be reduced to one-half or one-third of the time depending, of course, on the resins or plastics utilized.

Spray Station

Furthermore, the apparatus of the invention can be used with fibrous mats or blanks which are not pre-impregnated with plastic or resin, but with the resin being applied to the fibrous mat by the apparatus. FIG. 12 shows one embodiment of mechanism for this purpose, and typically positioned between the load station and the preheat station with the preheat station being moved 30° into the mold close station. Or the spray station can take the place of the preheat station. In either event, the spray station includes a spray nozzle 52 mounted on a bracket 53 carried on plate 1 and directed to apply resin or plastic in spray form on a mat or blank carried on the male mold member 14 at the station. Resin or plastic is supplied to the nozzle 52 by a supply conduit 54 through a valve 55 operated by a solenoid 56 under the control of a microswitch 58 connected to a time control relay 59 and the power source 70. The microswitch 58 is closed by a cam 58a carried on the gear 6 when the chamber 5 has been indexed to bring the mold 14 to proper position. The relay 59 can be adjusted to control the duration of the spray.

The apparatus of the invention is sufficiently versatile so that a second spray mechanism can be positioned to coat the blank after it has been partially cured in a preform operation, if this be desirable.

Thus, it will be seen that the objects of the invention have been accomplished by the provision of fully automatic apparatus which need only be loading periodically with a stack of mats by the operator and who need only inspect and clean the molds if required. The apparatus can be used with resin impregnated mats or blanks or with mats or blanks not previously impregnated which can be impregnated on the apparatus. Fully finished parts or "preforms" can be made.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for automatically making fiber and plastic parts including a fixed drum, an endless chamber surrounding the drum and rotatably mounted thereon, a plurality of circumferentially-spaced perforate molds mounted around the periphery of the chamber, radial directed partitions in the drum and conduit means dividing the surface of the drum into circumferentially-spaced arcuate areas of low vacuum, high vacuum, low vacuum and internal pressure, the outer surface of the drum having openings therethrough into the areas and the inner surface of the endless chamber having openings therethrough adjacent each mold connecting in turn to the openings in the drum, means for periodically rotating the endless chamber a stepped arcuate distance equal to the distance between molds, means fixed in relation to the drum for loading a substantially flat body of fibers and plastic on each mold when it is in radial alignment with the low vacuum area of the drum, stationary means for preheating the body after the mold has been arcuately stepped from the loading means but is still in the low vacuum area of the drum, a plurality of complementary frame-type molds mounted on the endless chamber and each adapted for movement to and from its associated mold, means for moving each complementary mold against the body of fibers and plastic upon stepped rotary movement of the mold from the preheating means, said means for moving the complementary molds being in the high vacuum area of the drum, a stationary low temperature oven about the molds in the high vacuum area of the drum, a stationary high temperature oven to effect curing of the body and adapted to receive each set of molds as its stepped arcuate movement causes it to leave the low temperature oven, said high temperature oven being in the second area of low vacuum of the drum, a cooling chamber for receiving each set of molds as it leaves the high temperature oven, means for moving the complementary mold away from its associated mold at the cooling chamber, and means positioned in the internal pressure area of the drum for discharging each molded body from the associated mold after the complementary mold has been moved away.

2. Apparatus for automatically making fiber and plastic parts including a fixed drum, an endless chamber surrounding the drum and rotatably mounted thereon, a plurality of circumferentially-spaced perforate molds mounted around the periphery of the chamber, radial directed partitions in the drum and conduit means dividing the surface of the drum into circumferentially-spaced arcuate areas of low vacuum, high vacuum, and low vacuum, the outer surface of the drum having openings therethrough into the areas and the inner surface of the endless chamber having openings therethrough adjacent each mold connecting in turn to the openings in the drum, means for periodically rotating the endless chamber a stepped arcuate distance equal to the distance between molds, means fixed in relation to the drum for loading a substantially flat body of fibers and plastic on each mold when it is in radial alignment with the low vacuum area of the drum, stationary means for preheating the body after the mold has been arcuately stepped from the loading means but is still in the low vacuum area of the drum, a plurality of complementary frame-type molds mounted on the endless chamber and each adapted for movement to and from its associated mold, means for moving each complementary mold against the body fibers and plastic upon stepped rotary movement of the mold from the preheating means, said means for moving the complementary molds being in the high vacuum area of the drum, a stationary low temperature oven about the molds in the high vacuum area of the drum, a stationary high temperature oven to effect curing of the body and adapted to receive each set of molds as its stepped arcuate movement causes it to leave the low temperature oven, said high temperature oven being in the second area of low vacuum of the drum, a cooling chamber for receiving each set of molds as it leaves the high temperature oven, and means for moving the complementary mold away from its associated mold at the cooling chamber.

3. Apparatus for automatically making fiber and plastic parts including a fixed drum, an endless chamber surrounding the drum and rotatably mounted thereon, a plurality of circumferentially-spaced perforate molds mounted around the periphery of the chamber, radial directed partitions in the drum and conduit means dividing the surface of the drum into circumferentially-spaced arcuate areas of low vacuum, high vacuum, and low vacuum, the outer surface of the drum having openings therethrough into the areas and the inner surface of the endless chamber having openings therethrough adjacent each mold connecting in turn to the openings in the drum, means for periodically rotating the endless chamber a stepped arcuate distance equal to the distance between molds, means fixed in relation to the drum for applying a substantially flat body of fibers and plastic on each mold when it is in radial alignment with the low vacuum area of the drum, stationary means for preheating the body after the mold has been arcuately stepped from the loading means but is still in the low vacuum area of the drum, a plurality of complementary molds mounted on the endless chamber and each adapted for movement to and from its associated mold, means for moving each complementary mold against the body of fibers and plastic upon stepped rotary movement of the mold from the preheating means, said means for moving the complementary molds being in the high vacuum area of the drum, a stationary low temperature oven about the molds in the high vacuum area of the drum, and a stationary high temperature oven to effect curing of the body and adapted to receive each set of molds as its stepped arcuate movement causes it to leave the low temperature oven, said high temperature oven being in the second area of low vacuum of the drum.

4. Apparatus for automatically making fiber and plastic parts including a fixed drum, an endless chamber surrounding the drum and rotatably mounted thereon, a plurality of circumferentally-spaced perforate molds mounted around the periphery of the chamber, radial directed partitions in the drum and conduit means dividing the surface of the drum into circumferentially-spaced arcuate areas of vacuum, the outer surface of the drum having openings therethrough into the areas and the inner surface of the endless chamber having openings therethrough adjacent each mold connecting in turn to the openings in the drum, means for periodically rotating the endless chamber a stepped arcuate distance equal to the distance between molds, means fixed in relation to the drum for loading a substantially flat body of fibers and plastic on each mold when it is in radial alignment with a vacuum area of the drum, stationary means for preheating the body after the mold has been arcuately stepped from the loading'means but is still in a vacuum area of the drum, a plurality of complementary frame-type molds mounted on the endless chamber and each adapted for movement to and from its associated mold, means for moving each complementary mold against the body of fibers and plastic upon stepped rotary movement of the mold from the preheating means, and a stationary high temperature oven to effect curing of the body and adapted to receive each set of molds after it has left the preheating means, said oven being in a vacuum area of the drum.

5. Apparatus for automatically making fiber and plastic parts including a fixed drum, an endless chamber surrounding the drum and rotatably mounted thereon, a plurality of circumferentially-spaced perforate molds mounted around the periphery of the chamber, radial directed partitions in the drum and conduit means dividing the surface of the drum into circumferentially-spaced arcuate areas of low vacuum, and high vacuum, the outer surface of the drum having openings therethrough into the areas and the inner surface of the endless chamber having openings therethrough adjacent each mold connecting in turn to the openings in the drum, means for periodically rotating the endless chamber a stepped arcuate distance equal to the distance between molds, means fixed in relation to the drum for applying a substantially flat body of fibers and plastic on each mold when it is in radial alignment with the low vacuum area of the drum, stationary means for preheating the body after the mold has been arcuately stepped from the loading means but is still in the low vacuum area of the drum, a plurality of complementary molds mounted on the endless chamber and each adapted for movement to and from its associated mold, means for moving each complementary mold against the body of fibers and plastic upon stepped rotary movement of the mold from the preheating means, said means for moving the complementary molds being in the high vacuum area of the drum, and an oven to effect curing of the body.

6. Apparatus for automatically making fiber and plastic parts including a fixed drum, an endless chamber surrounding the drum and rotatably mounted thereon, a plurality of circumferentially-spaced perforate molds mounted around the periphery of the chamber, radial directed partitions in the drum and conduit means dividing the surface of the drum into circumferentially-spaced arcuate areas of vacuum, the outer surface of the drum having openings therethrough into the areas and the inner surface of the endless chamber having openings therethrough adjacent each mold connecting in turn to the openings in the drum, means for periodically rotating the endless chamber a stepped arcuate distance equal to the distance between molds, means fixed in relation to the drum for loading a substantially flat body of fibers and plastic on each mold when it is in radial alignment with a vacuum area of the drum, a plurality of complementary frame-type molds mounted on the endless chamber and each adapted for movement to and from its associated mold, means for moving each complementary mold against the body of fibers and plastic upon stepped rotary movement of the mold, and a stationary high temperature oven to effect curing of the body and adapted to receive each set of molds, said oven being in a vacuum area of the drum.

References Cited in the file of this patent

UNITED STATES PATENTS

| 1,525,629 | Thompson | May 26, 1925 |
| 1,807,155 | Frederick | May 26, 1931 |
| 2,497,212 | Donofrio | Feb. 14, 1950 |
| 2,525,135 | Huff | Oct. 10, 1950 |
| 2,580,883 | Borkland | Jan. 1, 1952 |
| 2,590,221 | Stevens | Mar. 25, 1952 |
| 2,765,493 | Worstead | Oct. 9, 1956 |
| 2,790,206 | Cofek | Apr. 30, 1957 |
| 2,834,986 | Bailey et al. | May 20, 1958 |
| 2,836,852 | Butzko | June 3, 1958 |
| 2,902,718 | Martelli et al. | Sept. 8, 1959 |
| 2,989,780 | Zimmerman | June 27, 1961 |

FOREIGN PATENTS

| 465,630 | Italy | Sept. 17, 1951 |
| 513,412 | Italy | Feb. 4, 1955 |
| 524,000 | Italy | Apr. 19, 1955 |